(12) United States Patent
Simkins

(10) Patent No.: US 7,580,426 B2
(45) Date of Patent: Aug. 25, 2009

(54) INTERFACE WITH MULTILEVEL PACKET PREEMPTION BASED ON BALANCING OF START AND END INDICATORS

(75) Inventor: Mark Benjamin Simkins, Macungie, PA (US)

(73) Assignee: Agere Systems Inc., Allentown, PA (US)

( * ) Notice: Subject to any disclaimer, the term of this patent is extended or adjusted under 35 U.S.C. 154(b) by 562 days.

(21) Appl. No.: 11/536,191

(22) Filed: Sep. 28, 2006

(65) Prior Publication Data

US 2008/0080557 A1 Apr. 3, 2008

(51) Int. Cl.
*H04J 3/24* (2006.01)
(52) U.S. Cl. ..................................... 370/474
(58) Field of Classification Search ................. 370/474
See application file for complete search history.

(56) References Cited

U.S. PATENT DOCUMENTS

| 6,671,758 | B1 | 12/2003 | Cam et al. |
| 2004/0004975 | A1 | 1/2004 | Shin et al. |
| 2005/0005021 | A1 | 1/2005 | Grant et al. |
| 2005/0138259 | A1 | 6/2005 | Khan et al. |
| 2005/0169298 | A1 | 8/2005 | Khan et al. |

FOREIGN PATENT DOCUMENTS

| EP | 0582537 | 2/1994 |
| EP | 0684719 | 11/1995 |
| EP | 1193938 | 4/2002 |
| WO | 2007067281 | 10/2007 |

OTHER PUBLICATIONS

U.S. Appl. No. 11/466,858, filed Aug. 24, 2006, A.P. Henry et al., "Port Addressing Method and Apparatus for Link Layer Interface."
Agere Systems, Product Brief, "Edge/Access and Multiservice Network Processors: APP550 and APP530," pp. 1-4, May 2003.
Implementation Agreement OIF-SPI3-01.0, "System Packet Interface Level 3 (SPI-3): OC-48 System Interface for Physical and Link Layer Devices," Optical Internetworking Forum, pp. 1-42, 2001.

(Continued)

*Primary Examiner*—Mang Yeung
(74) *Attorney, Agent, or Firm*—Ryan, Mason & Lewis, LLP

(57) ABSTRACT

Preemption techniques for use in conjunction with an interface between a physical layer device and a link layer device are disclosed. Segments associated with or comprising packets, cells or other protocol data units (PDUs) are communicated between the physical layer device and the link layer device via an interface bus. At least first and second consecutive start indicators having respective first and second data segments associated therewith are received by one of the devices from the other, and the second data segment is permitted to preempt the first data segment without signaling an interface protocol violation, subject to subsequent confirmation that the preemption is appropriate. If a number of consecutive end indicators is subsequently received that balances the number of consecutive start indicators, the preemption is confirmed as appropriate, and otherwise an interface protocol violation is signaled.

20 Claims, 4 Drawing Sheets

OTHER PUBLICATIONS

PMC-Sierra, Inc. "Packet Over Sonet, Implementing Packet Based ONET/SDH Links," White Paper, PMC-971161, Issue 1, 19 pages, downloaded from www.pmc-sierra.com/pdf/whitePaper-packetOverSonet.pdf on Aug. 23, 2006.

PMC-Sierra, Inc."Saturn Compatible Packet Over Sonet Interface Specification for Physical Layer Devices," POS-PHY™, Level 2, PMC-971147, Issue 5, 41 pages, Dec. 1998.

ITU-T Recommendation G.993.2, Series G: Transmission Systems and Media, Digital Systems and Networks, "Very High Speed Digital Subscriber Line Transceivers 2 (VDSL2)," pp. 1-24, Feb. 2006.

INTERFACE WITH MULTILEVEL PACKET PREEMPTION BASED ON BALANCING OF START AND END INDICATORS

FIELD OF THE INVENTION

The present invention relates generally to communication devices for use in network-based communication systems, and more particularly to interfaces between a physical layer device and a link layer device.

BACKGROUND OF THE INVENTION

A network processor is one example of what is more generally referred to herein as a link layer device, where the term "link layer" generally denotes a switching function layer, also referred to as the data link layer in the well-known Open Systems Interconnection (OSI) model. Network processors and other link layer devices are commonly used to implement processing associated with various packet-based and cell-based protocols, such as, for example, Internet protocol (IP) and asynchronous transfer mode (ATM).

Communication between a physical layer device and a network processor or other type of link layer device may be implemented in accordance with an interface standard, such as the POS-2 standard described in "POS-PHY Saturn Compatible Packet Over SONET Interface Specification for Physical Layer Devices," Level 2, PMC-Sierra, Inc., 1998, which is incorporated by reference herein. Another example of a known interface standard is the SPI-3 interface standard described in Implementation Agreement OIF-SPI3-01.0, "System Packet Interface Level 3 (SPI-3): OC-48 System Interface for Physical and Link Layer Devices," Optical Internetworking Forum, 2001, also incorporated by reference herein.

A given physical layer device may comprise a multiple-port device which communicates over multiple channels with the link layer device. Such communication channels, also commonly known as MPHYs, may be viewed as examples of what are more generally referred to herein as physical layer device ports. A given set of MPHYs that are coupled to a link layer device may comprise multiple ports associated with a single physical layer device, multiple ports each associated with one of a plurality of different physical layer devices, or combinations of such arrangements. As is well known, a link layer device may be advantageously configured to detect backpressure for a particular MPHY via polling of the corresponding MPHY address on its associated physical layer device. The detected backpressure is used by the link layer device to provide flow control and other traffic management functions, thereby improving link utilization.

The above-noted interface standards generally specify techniques for addressing an MPHY and for moving payload data over the interface. The addressing may use the same or separate pins from the payload. For the POS-2 standard, the MPHY address uses pins that are separate from the payload, and the maximum number of MPHYs that can be specified is 31. There are well-known extensions to the POS-2 standard that increase the maximum number of MPHYs in increments of 31 by using additional pins. For the 8-bit mode of the SPI-3 standard, the MPHY address uses eight payload pins and thus the maximum number of MPHYs that can be specified is $2^8=256$.

U.S. patent application Ser. No. 11/466,858, filed Aug. 24, 2006 in the name of inventors A. P. Henry et al. and entitled "Port Addressing Method and Apparatus for Link Layer Interface," which is incorporated by reference herein, discloses efficient techniques for supporting much larger numbers of MPHYs in a multiservice environment while maintaining compliance with one or more interface standards. These techniques avoid the need for additional address pins, and also overcome other MPHY addressing problems of conventional practice, such as excessive memory requirements and bandwidth reduction.

Another issue that can arise in utilizing standard interfaces such as POS-2 and SPI-3 relates to packet preemption. Such packet preemption is permitted in, for example, certain applications in which the physical layer device comprises a digital subscriber line (DSL) transceiver. As a more particular example, ITU-T Recommendation G.993.2, "Very High Speed Digital Subscriber Line 2," February 2006, which is incorporated by reference herein, describes the standard requirements for a type of DSL referred to as VDSL-2. The VDSL-2 standard defines packet preemption as allowing for the transport of high-priority and low-priority packet flows through a single bearer channel. Typically, the transmission of a low-priority packet is paused, a high-priority packet is transmitted, and then the transmission of the low-priority packet is resumed. The VDSL-2 standard further states that preemption minimizes the packet insertion delay for the high-priority packets at the expense of a higher delay for the low-priority packets. Such preemption allows delay-critical traffic such as voice and video packets to have priority over other data packets such as web pages, email, etc.

In the VDSL-2 context, packet preemption is used in packet transfer mode, where packets are transferred to the VDSL-2 transceiver from a link layer device such as a network processor. The above-noted POS-2 or SPI-3 interfaces may be used to provide the interface between the VDSL-2 transceiver and the link layer device. Unfortunately, conventional implementations of the POS-2 or SPI-3 interfaces do not provide sufficient support for packet preemption. As a result, more complex signaling approaches are required, which can unduly increase the costs associated with a given implementation.

A need therefore exists for techniques for configuring otherwise standard interfaces such as POS-2 or SPI-3 to facilitate the provision of multilevel packet preemption for DSL and other applications.

SUMMARY OF THE INVENTION

The present invention meets the above-noted need by providing in an illustrative embodiment a modified standard interface which supports multilevel packet preemption in a particularly efficient manner.

In one aspect of the invention, data segments associated with or comprising packets, cells or other protocol data units (PDUs) are communicated between the physical layer device and the link layer device via an interface bus. The interface bus may be part of an otherwise conventional standard interface, such as a SPI-3 or POS-2 interface. At least first and second consecutive start indicators having respective first and second data segments associated therewith are received by one of the devices from the other, and the second data segment is permitted to preempt the first data segment without signaling an interface protocol violation, subject to subsequent confirmation that the preemption is appropriate. If a number of consecutive end indicators is subsequently received that balances the number of consecutive start indicators, the preemption is confirmed as appropriate, and otherwise an interface protocol violation is signaled.

The preemption techniques can be adapted in a straightforward manner to provide any desired number of levels of preemption. For example, an arbitrary number n of levels of preemption may be provided, wherein n consecutive start indicators are received for n respective packets, and preemption of each of n−1 packets by packet n is confirmed by subsequent receipt of n consecutive end indicators.

In an illustrative embodiment, the data segments are directed to a common MPHY address, and the consecutive start indicators comprise multiple consecutive assertions of an xSOP signal for the same MPHY without intervening assertions of an xEOP signal. The multiple consecutive assertions of the xSOP signal for the same MPHY without intervening assertions of the xEOP signal are recognized as being indicative of appropriate preemptions if and only if followed by an equivalent number of consecutive assertions of the xEOP signal.

Advantageously, the invention in the illustrative embodiments provides efficient support for multilevel packet preemption using an otherwise conventional POS-2 or SPI-3 interface. This considerably facilitates the use of packet preemption in numerous applications, such as VDSL-2 or other DSL applications.

DETAILED DESCRIPTION OF THE INVENTION

The invention will be illustrated herein in conjunction with an exemplary network-based communication system which includes a link layer device, a physical layer device and other elements configured in a particular manner. It should be understood, however, that the invention is more generally applicable to any system in which it is desirable to provide improved preemption as described herein. Also, although the illustrative embodiments will be described as involving packet preemption, the disclosed techniques are applicable to cells or other types of PDUs. The general term "data segment" will be used herein to denote packets, cells or other PDUs, or portions of such groupings of data.

A "link layer device" or LLD as the term is used herein refers generally to a network processor or other type of processor which performs processing operations associated with a link layer of a network-based system. Such a device may be implemented, by way of example and without limitation, utilizing a microprocessor, central processing unit (CPU), digital signal processor (DSP), application-specific integrated circuit (ASIC), or other type of data processing device, as well as portions or combinations of these and other devices.

A "physical layer device" or PLD as the term is used herein refers generally to a device which provides an interface between a link layer device and a physical transmission medium of a network-based system.

Figure 1:
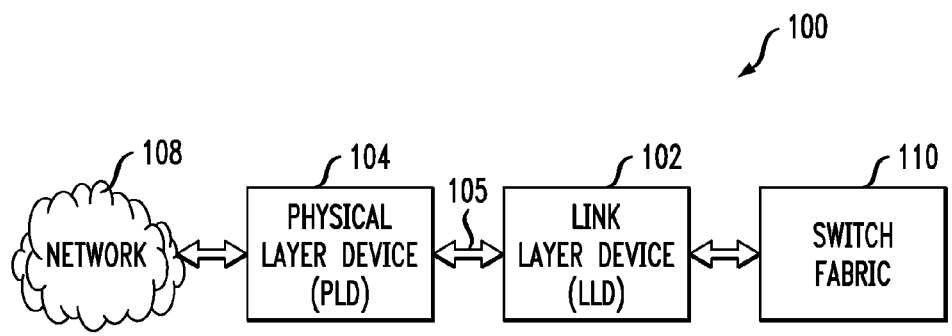
FIG. 1 is a simplified block diagram of a network-based communication system in accordance with an illustrative embodiment of the invention.

FIG. 1 shows a network-based communication system 100 in an illustrative embodiment of the invention. The system 100 includes a link layer device (LLD) 102 coupled to a physical layer device (PLD) 104 via an interface 105. The interface 105, which comprises an interface bus having multiple signal lines, may be configured as an otherwise conventional SPI-3, POS-2 or other similar interface, altered in a manner to be described below. The PLD 104 is coupled to a network 108. The LLD 102 is coupled to a switch fabric 110. The LLD 102 is configured to communicate packets, cells or other PDUs between the network 108 and the switch fabric 10 which controls switching of PDU data. A given LLD may, for example, include conventional capabilities to move traffic for different services using different scheduling algorithms.

The PLD 104 serves to interface the LLD to physical transmission media of the network 108. For example, the PLD 104 may comprise a DSL transceiver or an optical transceiver configured to interface the LLD to respective DSL or optical transmission media. Numerous other types of transmission media may be used in implementing the invention, and the PLD may be configured in a straightforward manner to accommodate such other media. In other embodiments, the PLD need not include a transceiver for interfacing with the network 108, and such a network transceiver may be implemented, by way of example, in a separate device that is arranged between the PLD and the network.

As indicated previously, packets, cells or other PDUs may be referred to herein as data segments. A given packet, cell or other PDU may also be comprised of multiple data segments. The term "data segment" as used herein is therefore intended to be broadly construed.

The LLD 102 may comprise, for example, a network processor such as a PayloadPlus® network processor in the APP300, APP500 or APP750 product family, commercially available from Agere Systems Inc. of Allentown, Pa., U.S.A.

The PLD 104 may comprise one or more devices suitable for providing access termination and aggregation for multiple services, or any other physical layer device of a type known to those skilled in the art.

It is to be appreciated that the invention is not limited to use with any particular type of LLD or PLD. Numerous such devices suitable for use with the present invention are well known to those skilled in the art. The conventional aspects of these devices will therefore not be described in detail herein.

It is also possible that the LLD and the PLD may be integrated together into a single device, such as an ASIC. The terms LLD and PLD as used herein should therefore be understood to include any set of one or more functional components which perform respective LLD and PLD operations in a single device.

It should also be noted that the particular arrangement of system elements shown in FIG. 1 is by way of illustrative example only. More particularly, the invention can be implemented in any type of system having at least one LLD and at least one PLD, and is not limited to the particular processing applications described herein. The system 100 may include other elements in addition to or in place of those specifically shown, including one or more elements of a type commonly found in a conventional implementation of such a system.

Figure 2:
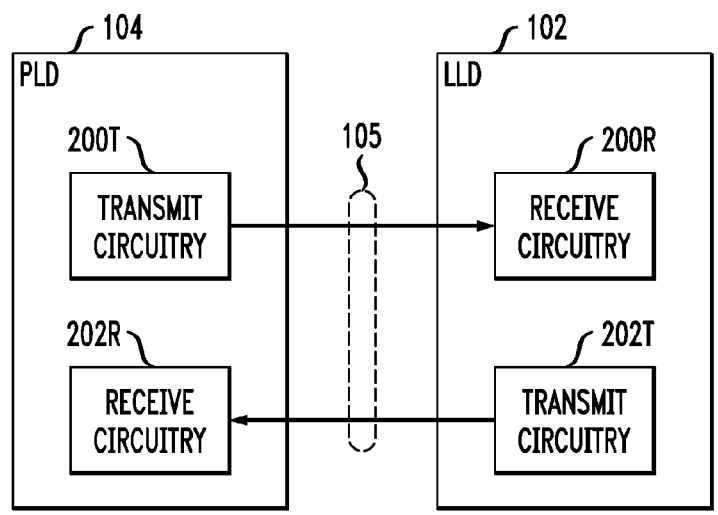
FIG. 2 shows a more detailed view of a portion of an interface between a link layer device and a physical layer device in the FIG. 1 system.

FIG. 2 shows a more detailed view of a portion of the interface between LLD 102 and PLD 104 in the system 100 of FIG. 1. The circuitry shown in this particular embodiment includes transmit circuitry 200T in the PLD 104 and receive circuitry 200R in the LLD 102 for supporting data transfer in a direction from the PLD to the LLD. The circuitry further includes transmit circuitry 202T in the LLD and receive circuitry 202R in the PLD for supporting data transfer in a direction from the LLD to the PLD. The circuitry 200, 202 may be configured in a conventional manner, for example, using known arrangements commonly used to implement POS-2 or SPI-3 interfaces. As is well known, such interfaces are implemented using an interface bus over which the PLD and LLD communicate.

Figure 3:
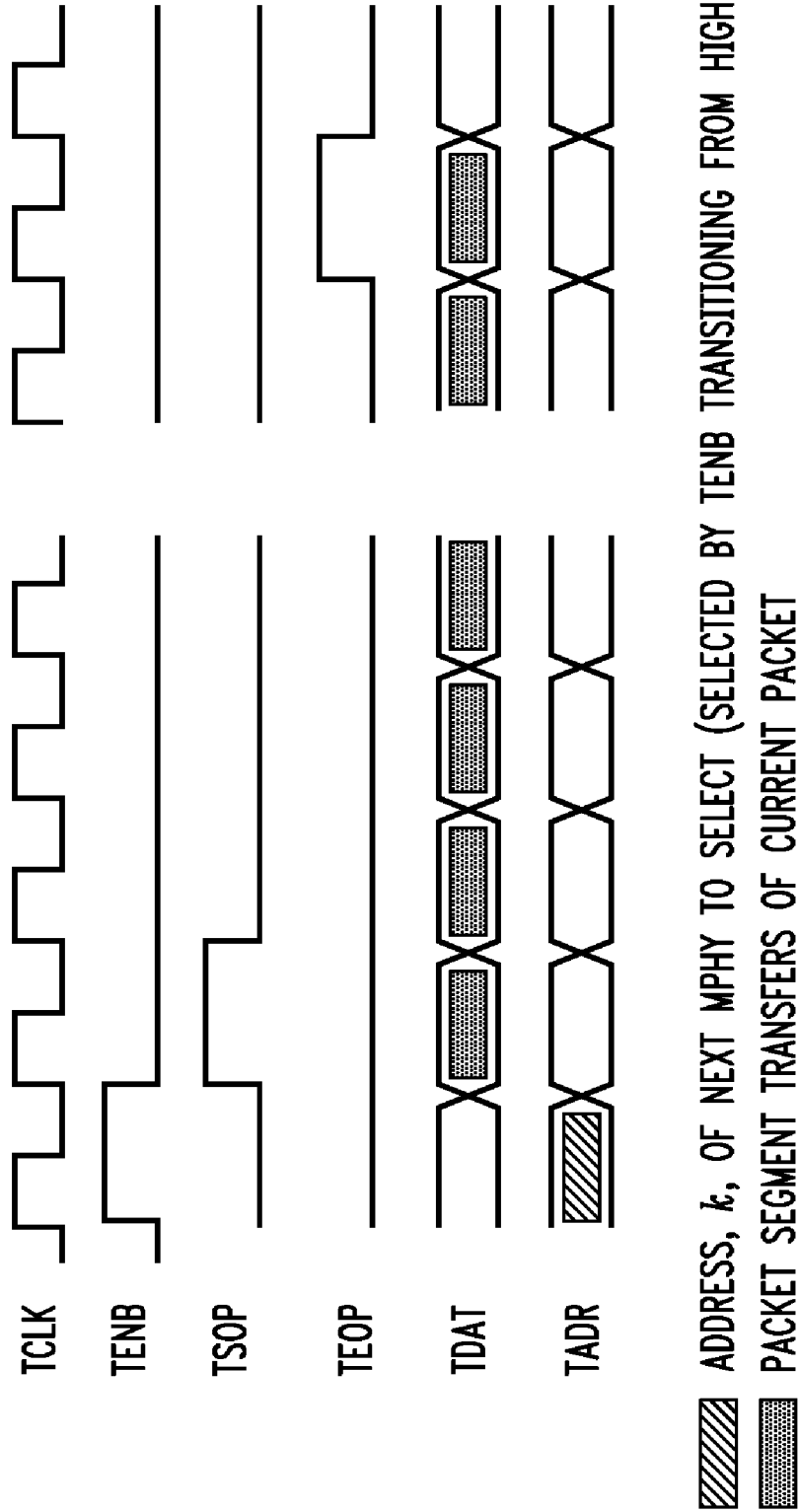
FIG. 3 shows conventional signaling associated with packet transfer over a POS-2 or SPI-3 interface.

With reference now to FIG. 3, conventional signaling associated with packet transfer over a POS-2 or SPI-3 interface is shown. Modifications to such an interface in accordance with an illustrative embodiment of the invention will subsequently be described with reference to the signaling diagram of FIG. 4 and the flow diagram of FIG. 5. Again, the following description will refer to packets and POS-2 or SPI-3 interfaces, but it should be understood that the described techniques can be applied to cells or other PDUs, or more generally data segments, and to other types of interfaces.

As previously noted herein, a conventional POS-2 or SPI-3 interface allows packets to be transmitted to a set of logical ports, called MPHYs. The packets may be of variable length and may be transmitted as multiple segments. Typically all segments in such an arrangement are set to a preconfigured length L, except the last segment of a packet, which can be any length from 1 to L, given the variable-length nature of packets. A given segment in this arrangement may be a first segment of a multi-segment packet transfer, a last segment of a multi-segment packet transfer, or an intermediate segment of a multi-segment packet transfer. Although the signaling diagrams of FIGS. 3 and 4 assume multi-segment packet transfer, it is possible that a given packet may comprise only a single segment, in which case that single segment is both the first and the last segment of the packet transfer.

Conventional POS-2 or SPI-3 packet transfer for transmit and receive portions of the interface utilizes, among other signals, an enable signal denoted xENB, a start of packet (SOP) signal denoted xSOP and an end of packet (EOP) signal denoted xEOP, where x=T or R, for respective transmit or receive portion of the interface. The signaling shown in FIG. 3 is for a transmit portion of the interface, and hence these three signals are more specifically denoted TENB, TSOP and TEOP. Assertions of the TSOP and TEOP signals in this embodiment may be viewed as examples of what are more generally referred to herein as start indicators and end indicators, respectively. The figure also shows a clock signal TCLK, a data signal TDAT and an address signal TADR, all associated with the transmit portion of the interface. These signals are carried by an interface bus of the interface 105 in the illustrative embodiments.

The enable signal TENB is used to identify a specific MPHY to which the packet transfer is directed. This MPHY is identified by the address carried by TADR at the falling edge of the enable signal TENB, denoted address k in the figure. TSOP goes active during the clock cycle following assertion of TENB and signals the start of transmission of the first segment of the packet to the selected MPHY. TEOP goes active during the last clock cycle of the packet transfer and signals the transmission of the last segment of the packet to the selected MPHY. As shown in the figure, the transmitted segments are carried by the TDAT signal.

Thus, each packet transfer to an MPHY on a transmit or receive portion of the interface 105 comprises one or more segments, with the starting and ending segments being delineated via the assertion of the respective xSOP and xEOP signals during the transfer of the of the respective first and last segment(s) of that packet to the specific MPHY. As is known, packet transfers to different MPHYs may be interleaved by selecting a different MPHY using the xENB signal as described above.

A problem that arises in conventional packet transfer via the POS-2 or SPI-3 interfaces is that the standards require that for each assertion of xSOP for packet transfer to a particular MPHY, there should be one and only one corresponding assertion of xEOP. Therefore, if there are two assertions of xSOP to a given MPHY without an intervening assertion of xEOP, this is considered a protocol violation. As was indicated previously, this condition makes it difficult to implement packet preemption using conventional POS-2 or SPI-3 interfaces.

The illustrative embodiments overcome this problem by permitting multiple assertions of xSOP without intervening assertions of xEOP. In these embodiments, multiple consecutive assertions of xSOP to the same MPHY but without intervening assertions of xEOP are recognized as being indicative of valid preemption transfers, as long as they are followed by the same number of consecutive assertions of xEOP. In other words, the xEOP assertions must balance the xSOP assertions to a given MPHY, or otherwise a protocol violation will be indicated.

Figure 4:
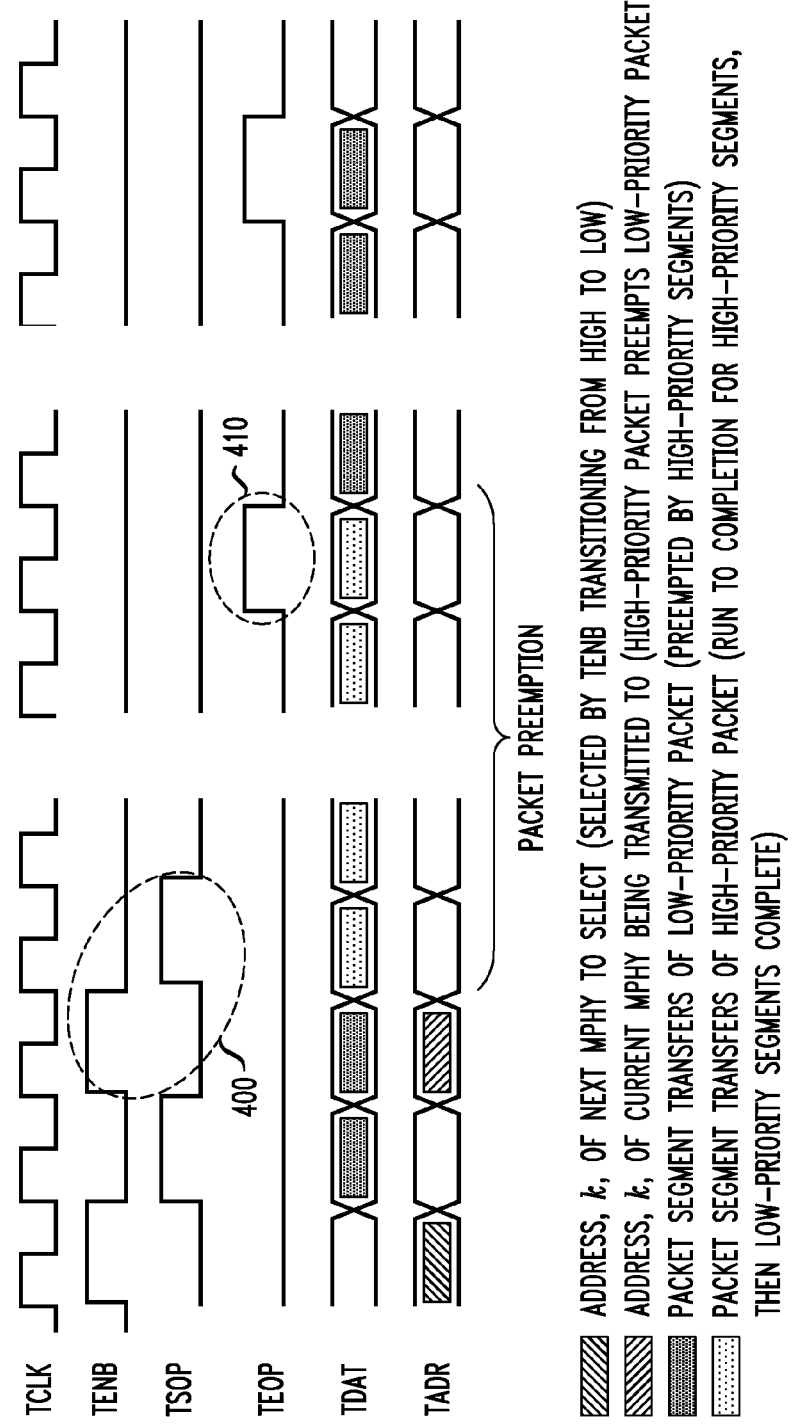
FIG. 4 shows modified signaling associated with implementation of multilevel packet preemption in an otherwise conventional POS-2 or SPI-3 interface in an illustrative embodiment of the invention.

FIG. 4 shows an example of the modified interface signaling to implement the technique described above. In this example, the enable signal TENB initiates a packet transfer to an MPHY having address k. This is followed on the next clock cycle by an assertion of TSOP, in accordance with the conventional POS-2 or SPI-3 interface standard. However, before the last segment of the packet is transmitted as indicated by an assertion of TEOP, the enable signal TENB initiates another packet transfer to the same MPHY, that is, the MPHY identified by address k. This is followed on the next clock signal by another assertion of TSOP, as indicated by reference numeral 400. It is assumed for this example that the first packet is a low-priority packet, and is to be preempted by the second packet, which is a high-priority packet. Such preemption would not be possible using the conventional POS-2 or SPI-3 interface, as the second assertion of TENB and TSOP before an intervening assertion of TEOP would be considered a protocol violation and would be signaled as such.

The illustrative embodiment does not signal this condition as a protocol violation, but instead allows the high-priority packet to preempt the low-priority packet as shown in the figure. Thus, transmission of the segments of the low-priority packet is interrupted, and transmission of the segments of the high-priority packet commences. Transmission of the final segment of the high-priority packet is indicated by assertion of TEOP as indicated by reference numeral 410. The transmission of the segments of the low-priority packet then pick up from the point at which they were interrupted, and after the remaining segments are transferred there is another assertion of TEOP.

It can be seen in this example that the number of consecutive assertions of TSOP to the given MPHY without intervening assertions of TEOP was two. These two assertions were eventually balanced by two consecutive assertions of TEOP. The illustrative embodiment detects this subsequent balance between assertions of TSOP and TEOP and utilizes it as a confirmation of appropriate packet preemption.

Figure 5:
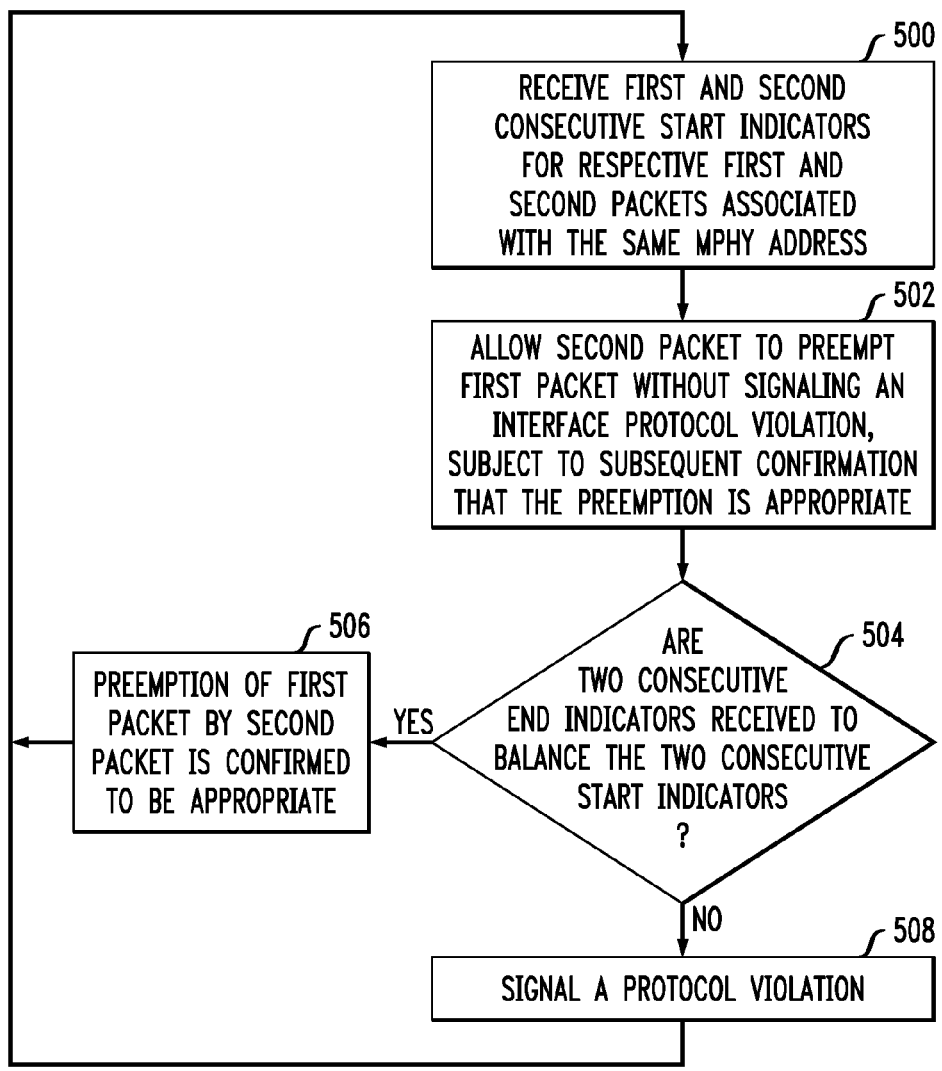
FIG. 5 is a flow diagram of a multilevel packet preemption process in an illustrative embodiment of the invention.

Turning now to the flow diagram of FIG. 5, exemplary operations associated with a packet preemption process are shown. This process may relate to a transmit portion of interface 105 or a receive portion of the interface, and may be implemented using a portion of the circuitry 200, 202 shown in FIG. 2.

In step 500, first and second consecutive start indicators associated with respective first and second packets are received. The start indicators may comprise, as indicated previously, assertions of the xSOP signal of an otherwise conventional POS-2 or SPI-3 interface. The first and second packets are directed to the same MPHY address, as indicated. In this context, the term "consecutive" refers to start indicators that occur without intervening end indicators. The end indicators may be, for example, assertions of the xEOP signal of an otherwise conventional POS-2 or SPI-3 interface.

In step 502, the second packet, which is assumed to be a higher priority packet than the first packet, is permitted to preempt the first packet, without signaling an interface protocol violation. This permission is subject to subsequent confirmation that the preemption is appropriate, based on balancing of the consecutive start indicators by an equal number of consecutive end indicators. In this case, the number of consecutive start indicators is two, for a type of two-level packet preemption, and thus confirmation would be based on subsequent receipt of two consecutive end indicators.

In step 504, a determination is made as to whether or not two consecutive end indicators have been received to balance the two consecutive start indicators. If two consecutive end indicators have been received, the preemption of the first packet by the second packet is confirmed to be appropriate as indicated in step 506. Otherwise, a protocol violation is signaled in step 508, using any type of technique used to signal such violations in conventional POS-2 or SPI-3 interfaces, or similar known interfaces. For example, a protocol violation may be signaled by storing information indicative of the violation in an internal status register or other memory location of the receiving device. A protocol violation may also or alternatively be signaled by communicating information indicative of the violation to higher layer protocols, or to other system devices.

After step 506 or 508, the process returns to step 500 for processing of additional packets, as indicated.

In designing a system with an interface of the type described above, the designer can determine how that system should react to a signaled protocol violation. By way of example, one or more configurable options may be provided, including:

1. Count violation only. In this approach, upper layer protocols detect and react to the violation. There may be a threshold associated with the violation count, to that severe problems can be detected and appropriate system-level action taken, such as resetting the interface.

2. Count violation and drop current segment(s).

3. Count violation and drop current segment(s) and any subsequent segments until a legitimate EOP is found.

A variety of other techniques can be used to handle signaled protocol violations, as will be appreciated by those skilled in the art.

The examples of FIGS. 4 and 5 show a type of two-level packet preemption, in that a second high-priority packet preempts a first low-priority packet. Other embodiments can use any desired number n of packet preemption levels. For example, in such an arrangement, n consecutive SOP assertions or other start indicators may be received for n respective packets, and preemption of each of n−1 prior packets by a final packet n may be confirmed by subsequent receipt of n consecutive EOP assertions or other end indicators. Numerous alternative preemption arrangements are possible using the disclosed techniques.

Advantageously, the illustrative embodiments allow packet preemption to be implemented in an efficient manner using otherwise conventional interface standards such as POS-2 and SPI-3. This can considerably reduce the cost and complexity associated with the provision of packet preemption in DSL applications such as the above-described VDSL-2, as well as a wide variety of other communication system applications.

The packet preemption techniques of the illustrative embodiments may be implemented at least in part in the form of software program code. For example, these techniques may be implemented at least in part utilizing LLD or PLD elements that are programmable via instructions or other software.

An LLD or PLD in accordance with the invention may be implemented as an integrated circuit device suitable for installation, for example, on a line card or port card of a router or switch. Numerous other configurations are possible.

In a given integrated circuit implementation, identical die are typically formed in a repeated pattern on a surface of a semiconductor wafer. Each die includes at least a portion of at least one device as described herein, and may include other structures or circuits. The individual die are cut or diced from the wafer, then packaged as an integrated circuit. One skilled in the art would know how to dice wafers and package die to produce integrated circuits. Integrated circuits so manufactured are considered part of this invention.

Again, the above-described embodiments of the invention are intended to be illustrative only. For example, although illustrated using POS-2 and SPI-3 interfaces, the invention can adapted in a straightforward manner for use with other types of standard or non-standard interfaces. Also, the particular arrangement of LLD, PLD, interface bus, switch fabric and other elements as shown in FIG. 1 may be varied in alternative embodiments. The particular types of indicators, signals and other features used in the illustrative embodiments may be altered to suit the needs of a wide variety of other applications. These and numerous other alternative embodiments within the scope of the following claims will be readily apparent to those skilled in the art.

What is claimed is:

1. A method comprising the step of:
   processing data segments communicated between a first device and a second device via an interface bus:
   the processing step further comprising the steps of:
   receiving in one of the first and second devices from the other of the first and second devices at least first and second consecutive start indicators having respective first and second data segments associated therewith;
   allowing the second data segment to preempt the first data segment without signaling an interface protocol violation, subject to subsequent confirmation that the preemption is appropriate;
   if a number of consecutive end indicators is subsequently received that balances the at least first and second consecutive start indicators, confirming that the preemption is appropriate, and otherwise signaling an interface protocol violation.

2. The method of claim 1 wherein the first and second data segments comprise respective first and second packets.

3. The method of claim 2 wherein the start indicators comprise start of packet indicators and the end indicators comprise end of packet indicators.

4. The method of claim 2 wherein an arbitrary number n of consecutive start indicators are received for n respective packets, and preemption of each of n−1 packets by packet n is confirmed by subsequent receipt of n consecutive end indicators.

5. The method of claim 1 wherein the interface is configured in accordance with a POS-2 interface protocol.

6. The method of claim 1 wherein the interface is configured in accordance with a SPI-3 interface protocol.

7. The method of claim 1 wherein the data segments are directed to a common MPHY address.

8. The method of claim 1 wherein said at least first and second consecutive start indicators comprise multiple consecutive assertions of an xSOP signal for a same MPHY without intervening assertions of an xEOP signal.

9. The method of claim 8 wherein multiple consecutive assertions of the xSOP signal for the same MPHY without intervening assertions of the xEOP signal are recognized as being indicative of appropriate preemptions if and only if followed by an equivalent number of consecutive assertions of the xEOP signal.

10. An apparatus comprising:
a first device configured for communication with a second device via an interface bus;
the first device comprising interface circuitry configured to receive from the second device at least first and second consecutive start indicators having respective first and second data segments associated therewith, and to allow the second data segment to preempt the first data segment without signaling an interface protocol violation, subject to subsequent confirmation that the preemption is appropriate;
wherein if a number of consecutive end indicators is subsequently received that balances the at least first and second consecutive start indicators, the preemption is confirmed as appropriate, and otherwise an interface protocol violation is signaled.

11. The apparatus of claim 10 wherein the first device comprises a physical layer device and the second device comprises a link layer device.

12. The apparatus of claim 11 wherein the physical layer device is implemented as an integrated circuit.

13. The apparatus of claim 11 wherein the physical layer device comprises a digital subscriber line transceiver.

14. The apparatus of claim 10 wherein the first device comprises a link layer device and the second device comprises a physical layer device.

15. The apparatus of claim 14 wherein the link layer device is implemented as an integrated circuit.

16. The apparatus of claim 14 wherein the link layer device comprises a network processor.

17. A communication system comprising:
a link layer device; and
a physical layer device;
the link layer device and the physical layer device being coupled together via an interface bus;
at least one of the link layer device and the physical layer device being configured to receive from the other at least first and second consecutive start indicators having respective first and second data segments associated therewith, and to allow the second data segment to preempt the first data segment without signaling an interface protocol violation, subject to subsequent confirmation that the preemption is appropriate, wherein if a number of consecutive end indicators is subsequently received that balances the at least first and second consecutive start indicators, the preemption is confirmed as being appropriate, and otherwise an interface protocol violation is signaled.

18. The system of claim 17 wherein an arbitrary number n of consecutive start indicators are received for n respective packets, and preemption of each of n−1 packets by packet n is confirmed by subsequent receipt of n consecutive end indicators.

19. The system of claim 17 wherein said at least first and second consecutive start indicators comprise multiple consecutive assertions of an xSOP signal for a same MPHY without intervening assertions of an xEOP signal.

20. The system of claim 19 wherein multiple consecutive assertions of the xSOP signal for the same MPHY without intervening assertions of the xEOP signal are recognized as being indicative of appropriate preemptions if and only if followed by an equivalent number of consecutive assertions of the xEOP signal.

* * * * *